(12) United States Patent
Heimberger et al.

(10) Patent No.: US 10,338,601 B2
(45) Date of Patent: Jul. 2, 2019

(54) METHOD FOR GENERATING A SURROUNDINGS MAP OF A SURROUNDING AREA OF A MOTOR VEHICLE, DRIVER ASSISTANCE SYSTEM AND MOTOR VEHICLE

(71) Applicant: VALEO Schalter und Sensoren GmbH, Bietigheim-Bissingen (DE)

(72) Inventors: Markus Heimberger, Bietigheim-Bissingen (DE); Vsevolod Vovkushevsky, Bietigheim-Bissingen (DE)

(73) Assignee: Valeo Schalter und Sensoren GmbH, Bietgheim-Bissingen (DE)

( * ) Notice: Subject to any disclaimer, the term of this patent is extended or adjusted under 35 U.S.C. 154(b) by 254 days.

(21) Appl. No.: 15/501,517

(22) PCT Filed: Aug. 4, 2015

(86) PCT No.: PCT/EP2015/067902
§ 371 (c)(1),
(2) Date: Feb. 3, 2017

(87) PCT Pub. No.: WO2016/020357
PCT Pub. Date: Feb. 11, 2016

(65) Prior Publication Data
US 2017/0261995 A1    Sep. 14, 2017

(30) Foreign Application Priority Data
Aug. 5, 2014 (DE) .................. 10 2014 111 126

(51) Int. Cl.
*G05D 1/00* (2006.01)
*G05D 1/02* (2006.01)
(Continued)

(52) U.S. Cl.
CPC ............ *G05D 1/0274* (2013.01); *B60W 40/04* (2013.01); *G01C 21/32* (2013.01); *G05D 1/0088* (2013.01);
(Continued)

(58) Field of Classification Search
CPC combination set(s) only.
See application file for complete search history.

(56) References Cited

U.S. PATENT DOCUMENTS 5,638,116 A * 6/1997 Shimoura ............ G05D 1/0246
348/118
5,745,868 A * 4/1998 Geier .................... G01C 21/28
340/988
(Continued)

FOREIGN PATENT DOCUMENTS

DE        103 24 897 A1    12/2004
DE    10 2005 003194 A1    7/2006
(Continued)

OTHER PUBLICATIONS

Notification of Reasons for Refusal issued in corresponding Japanese Patent Application No. 2017-506399, dated Feb. 27, 2018 (6 pages).
(Continued)

*Primary Examiner* — Jonathan L Sample
(74) *Attorney, Agent, or Firm* — Osha Liang LLP

(57) ABSTRACT

The invention relates to a method for generating a surroundings map (14) of a surrounding area (7) of a motor vehicle (1) in which an object in the surrounding area (7) is detected by means of a sensor device (9) of the motor vehicle (1), a position value (P) that describes a position of the object is determined on the basis of sensor data of the sensor device (9) by means of a control device (3) of the motor vehicle (1) and the determined position value (P) is transferred into the
(Continued)

surroundings map (14), wherein a vector (v') between the object and a predetermined reference point (11) of the motor vehicle (1) that forms an origin (0') of a vehicle coordinate system (12) is determined, the determined vector (v') is transformed from the vehicle coordinate system (12) into a global coordinate system (13) of the surroundings map (14) and the position value (P) in the surroundings map (14) is determined on the basis of the transformed vector (v).

12 Claims, 3 Drawing Sheets

(51) Int. Cl.
| | | |
|---|---|---|
| *B60W 40/04* | (2006.01) | |
| *G06T 7/70* | (2017.01) | |
| *G01C 21/32* | (2006.01) | |
| *G08G 1/16* | (2006.01) | |

(52) U.S. Cl.
CPC ............ *G05D 1/0231* (2013.01); *G06T 7/70* (2017.01); *G06T 2207/30261* (2013.01); *G08G 1/16* (2013.01)

(56) References Cited

U.S. PATENT DOCUMENTS

| | | | | |
|---|---|---|---|---|
| 5,983,161 A * | 11/1999 | Lemelson | ............... | G01S 19/11 340/436 |
| 6,502,033 B1 * | 12/2002 | Phuyal | .................. | G01C 21/30 340/988 |
| 7,072,764 B2 * | 7/2006 | Donath | .................... | B60R 1/00 701/532 |
| 7,299,057 B2 * | 11/2007 | Anderson | ............. | G01C 21/20 455/411 |
| 7,369,924 B2 * | 5/2008 | Han | ..................... | A01B 69/001 701/28 |
| 7,502,688 B2 * | 3/2009 | Hirokawa | ............ | G01C 21/165 342/357.31 |
| 7,522,995 B2 * | 4/2009 | Nortrup | ............. | G01C 21/3667 701/425 |
| 7,610,123 B2 * | 10/2009 | Han | ....................... | G01C 21/28 701/14 |
| 7,792,607 B2 * | 9/2010 | Han | ..................... | A01B 69/001 700/245 |
| 7,844,077 B2 * | 11/2010 | Kochi | .................... | G06T 7/579 382/103 |
| 7,957,897 B2 * | 6/2011 | Basnayake | ............ | G01C 25/00 701/501 |
| 8,924,218 B2 * | 12/2014 | Corpier | .................. | A61G 5/024 701/22 |
| 9,251,705 B2 * | 2/2016 | Yoo | ........................ | G08G 1/166 |
| 2006/0149472 A1 * | 7/2006 | Han | ....................... | G01C 21/28 701/14 |
| 2006/0190163 A1 * | 8/2006 | Anderson | ............. | G01C 21/20 455/456.1 |
| 2007/0219720 A1 * | 9/2007 | Trepagnier | ............ | B60W 30/00 701/300 |
| 2008/0154504 A1 * | 6/2008 | Hein | ........................ | G01S 1/68 701/300 |
| 2009/0175498 A1 * | 7/2009 | Kochi | ....................... | G06T 7/74 382/103 |
| 2009/0228204 A1 * | 9/2009 | Zavoli | .................... | G01C 21/30 701/532 |
| 2010/0017128 A1 * | 1/2010 | Zeng | .................... | B60W 40/105 701/301 |
| 2010/0217524 A1 * | 8/2010 | Oohashi | ................. | G01C 21/30 701/472 |
| 2010/0292886 A1 * | 11/2010 | Szczerba | ............. | G01C 21/365 701/31.4 |
| 2011/0071755 A1 * | 3/2011 | Ishigami | .............. | G01C 21/165 701/478.5 |
| 2011/0190972 A1 * | 8/2011 | Timmons | ................ | G01C 21/34 701/31.4 |
| 2011/0282578 A1 * | 11/2011 | Miksa | .................... | G01C 11/04 701/532 |
| 2011/0301779 A1 * | 12/2011 | Shida | ..................... | G01S 5/0072 701/1 |
| 2012/0122486 A1 * | 5/2012 | Day | ..................... | G05D 1/0278 455/456.1 |
| 2012/0136666 A1 * | 5/2012 | Corpier | ............... | H04L 12/2829 704/275 |
| 2014/0032012 A1 * | 1/2014 | Joshi | ..................... | G01S 13/865 701/1 |

FOREIGN PATENT DOCUMENTS

| | | |
|---|---|---|
| DE | 10 2007 023888 A1 | 1/2008 |
| DE | 10 2010 018 994 A1 | 11/2011 |
| DE | 10 2012 214 307 A1 | 2/2014 |
| DE | 10 2012 023746 A1 | 6/2014 |
| EP | 0 650 866 B1 | 5/1997 |
| EP | 2 172 920 A1 | 4/2010 |
| EP | 1 731 922 B1 | 7/2013 |
| JP | H7-218611 A | 8/1995 |
| JP | 2007-145246 A | 6/2007 |
| JP | 2008-304344 A | 12/2008 |
| JP | 2009-217333 A | 9/2009 |

OTHER PUBLICATIONS

International Search Report issued in PCT/EP2015/067902 dated Nov. 6, 2015 (3 pages).
Written Opinion of the International Searching Authority issued in PCT/EP2015/067902 dated Nov. 6, 2015 (8 pages).

* cited by examiner

METHOD FOR GENERATING A SURROUNDINGS MAP OF A SURROUNDING AREA OF A MOTOR VEHICLE, DRIVER ASSISTANCE SYSTEM AND MOTOR VEHICLE

The present invention relates to a method for generating a surroundings map of a surrounding area of a motor vehicle in which an object in the surrounding area is detected by means of a sensor device of the motor vehicle, a position value that describes a position of the object is determined on the basis of sensor data of the sensor device by means of a control device of the motor vehicle and the determined position value is transferred into the surroundings map. The invention also relates to a driver assistance system and to a motor vehicle.

In the present case, interest is focused in particular on driver assistance systems, which assist the driver in maneuvering the motor vehicle or are used fully automatically for navigating the motor vehicle. Such a driver assistance system can assist the driver for example when parking the motor vehicle and/or leaving a parking space or can search fully automatically for parking spaces and, if desired by the driver, park the vehicle in the parking space. The driver assistance system may also serve for preventing a collision between the motor vehicle and an object. Such driver assistance systems use information concerning the characteristics of the surroundings of the vehicle. This information may for example be stored in a digital surroundings map, which describes the surrounding area of the motor vehicle or the surrounding vicinity of the vehicle.

In this respect, EP 0 650 866 B1 describes a method for maneuvering a vehicle out of a parking space, the distance from an obstacle in the driving direction being measured by means of sensors attached to the vehicle. Also provided is a controller, which with the aid of the measured values forms a local surroundings map in the area of the vehicle, in which spatial data and data of the obstacles are entered. In addition, the controller determines with the aid of the surroundings map a surrounding model, with which a strategy for maneuvering the vehicle out of the parking space is established.

Most of the known surroundings maps are so-called grid-based maps. That is to say that the surroundings map is divided into a grid. The individual grids may also be referred to as cells. Detected objects are stored in the surroundings map by the grid that is correspondingly associated with the relevant distance from the vehicle being marked as occupied. In EP 1 731 922 B1, a method for determining free areas in a surrounding vicinity of a motor vehicle is described. This involves using a signal transit time measurement for measuring objects in the surrounding vicinity of the motor vehicle. On the basis of the results of the signal transit time measurement, an object probability distribution is determined and fused with an obstacle probability distribution. In this case, the obstacle probability distribution is represented by means of a cellular surroundings map of the motor vehicle. During the fusion, the occupancy values of the cells are reduced and/or increased, the cells originally having a predetermined occupancy value.

Furthermore, DE 10 2012 214 307 A1 describes a method for modelling a surrounding area of an object, in particular a vehicle. This involves providing at least one cell with unique identifications. In addition, a discrete occupancy value or an occupancy probability is specified for the cell. If an obstacle is detected, its position is determined and a discrete obstacle position that corresponds to the position of the obstacle is determined in one of the cells provided. Moreover, the occupancy value or the occupancy probability of the at least one discrete obstacle position is altered in such a way that the presence of the obstacle is indicated.

To be able to store the objects in a grid-based surroundings map, the obstacles usually have to be standardized. A very simple possible way of doing this is for the grid to include a counter, which describes how often the object has been detected in the respective grid. In this case, various probability theories, such as Bayes or Dempster Shafer, may be taken into consideration.

In addition, it may be the case that different driver assistance systems use different sensors. If a driver assistance function produces a representation of the surroundings of the motor vehicle independently and on its own, it may be the case that the sensor data fusion is made more difficult as a result. In this respect, DE 10 2010 018 994 A1 describes a method for operating a driver assistance system of a vehicle, information concerning a surrounding vicinity of the vehicle being provided by at least one sensor of the driver assistance system and this information being used to provide sensor data. Moreover, a digital surroundings map is calculated from the sensor data and a functionality is provided by the driver assistance system in the vehicle on the basis of the surroundings map. The surroundings map is calculated for at least two different functionalities of the driver assistance system in a common format, and the at least two functionalities are provided by the driver assistance system on the basis of the common surroundings map.

Furthermore, it may be the case that, when standardizing data of different driver assistance systems, information very quickly becomes excessively abstract. Such information may for example be a spatial unsharpness or a covariance that describes with which spatial resolution the sensors of the driver assistance system can detect the object. This information must be stored as an additional attribute and, with this method, additional effort has to be expended to fuse the objects. The spatial uncertainty is a basic method that is usually used, by which a later data fusion or decision-making criteria can be brought about. For instance, it can be determined for example with which spatial probability an object is or is not in a likely driving path of the motor vehicle.

The object of the present invention is to present a way in which driver assistance systems that use a surroundings map of a surrounding area of a motor vehicle can be operated more reliably.

This object is achieved according to the invention by a method, by a driver assistance system and by a motor vehicle with the features according to the respective independent patent claims. Advantageous embodiments of the invention are the subject of the dependent claims, the description and the figures.

A method according to the invention serves for generating a surroundings map of a surrounding area of a motor vehicle. In this case, an object in the surrounding area is detected by means of a sensor device of the motor vehicle. A position value that describes a position of the object is determined on the basis of sensor data of the sensor device by means of a control device of the motor vehicle and the determined position value is transferred into the surroundings map. Furthermore, a vector between the object and a predetermined reference point of the motor vehicle that forms an origin of a vehicle coordinate system is determined, the determined vector is transformed from the vehicle coordinate system into a global coordinate system of the surroundings map and the position value in the global coordinate system is determined on the basis of the transformed vector.

In the present case, at least one object in the surrounding area of the motor vehicle or in the surrounding vicinity of the vehicle is detected by a sensor device. The sensor device may comprise corresponding distance sensors, with which a distance from the motor vehicle to the object can be determined. This allows a control device of the motor vehicle to determine on the basis of the sensor data a position of the object or a relative position of the motor vehicle in relation to the object. In the motor vehicle, a reference point is predetermined. This reference point may for example be the midpoint of the rear axle of the motor vehicle. Taking this reference point as a basis, a vector is determined in relation to the object. This vector comprises an item of direction information and an item of distance information, which describe the position of the reference point in relation to the object. Taking the vehicle coordinate system as a basis, the origin of which is placed at the reference point of the motor vehicle, the determined vector is transformed into a global coordinate system or world coordinate system of the surroundings map. On the basis of the transformed vector in the global coordinate system, a position of the object in the surroundings map is determined and indicated as a position value in the surroundings map.

According to the invention, therefore, a vectorial surroundings map of the surrounding area of the motor vehicle is provided. In this case, the determined position of the object in the surrounding area of the motor vehicle is represented on the basis of a vector in a global coordinate system of the surroundings map. Consequently, the position of the object that is represented in the surroundings map is independent of the movement of the motor vehicle. The fact that the position value that describes the position of the object is stored in the surroundings map or in the global coordinate system as a vector means that the surroundings map can be scaled more easily in comparison with known grid-based surroundings maps. In particular, it is possible to prevent a data loss from occurring during the scaling. Moreover, the position value can be stored efficiently in the vectorial surroundings map.

The position value is preferably determined additionally on the basis of a predetermined origin of the global coordinate system. The surroundings map describes a predetermined area in the surrounding area of the motor vehicle. In this case, an origin for the global coordinate system is defined in the surrounding area. This may for example take place during starting of the driver assistance system or of the motor vehicle. It may involve carrying out a corresponding initialization of the driver assistance system, in which the origin of the global coordinate system is determined or established. Taking this established origin of the global coordinate system as a basis, the position of the object in the surroundings map is determined on the basis of the transformed vector. The position of the object or the position value in the global coordinate system consequently no longer changes over time, or in particular during movement of the motor vehicle, if it is a static object.

In a further embodiment, the origin of the vehicle coordinate system is transformed into the global coordinate system and the transformed origin of the vehicle coordinate system is indicated in the surroundings map. Indicating the origin of the vehicle coordinate system in the surroundings map also allows the position of the motor vehicle or the position of the reference point of the motor vehicle to be determined in the global coordinate system, and consequently in the surroundings map. Consequently, the relative position of the motor vehicle with respect to the object is stored in the surroundings map. This information can be used by the driver assistance systems of the motor vehicle.

It is also advantageous if a movement of the motor vehicle itself is continuously determined and the position of the origin of the vehicle coordinate system in the surroundings map is changed on the basis of the determined movement of the motor vehicle itself. The movement of the motor vehicle itself may for example be determined with the aid of a satellite-assisted position determination system. Alternatively or in addition, the movement of the motor vehicle itself may be determined by means of odometry. For this purpose, the number of revolutions of at least one wheel of the motor vehicle is determined. Furthermore, the steering angle of the motor vehicle may be continuously determined. Information concerning the movement of the motor vehicle itself may be used for continuously updating the position of the motor vehicle in the surroundings map, that is to say the position of the origin of the vehicle coordinate system in the global coordinate system. In this way, information concerning the relative position of the motor vehicle in relation to the object can be provided for the vehicle assistance systems. The advantage of storing the movement or trajectory of the motor vehicle itself in a surroundings map is that, for example when aborting a parking manoeuvre, the motor vehicle can be navigated back to the starting point. Furthermore, as a result the viewing angle at which detected objects have been entered in the surroundings map can also be reconstructed.

In a further refinement, on the basis of the transformed origin of the vehicle coordinate system, an area for indicating the position value in the global coordinate system is predetermined. Therefore, an area in the global coordinate system that surrounds the origin of the vehicle coordinate system transformed into the global coordinate system can be predetermined. This area may be chosen as rectangular or square. The area may also be chosen such that the origin of the vehicle coordinate system is also substantially in this predetermined area. In the present case, objects are only indicated in the surroundings map if they are in this area. Consequently, it can for example be made possible that only objects that are relevant to operation of the motor vehicle are indicated. Objects that are far away from the motor vehicle are not indicated in the present case.

Here it is provided in particular that the position value is erased from the surroundings map if the position value is outside the predetermined area. The dimensions of the predetermined area with respect to the spatial directions of the global coordinate system may be in particular at least half the area that is represented by the global coordinate system. Consequently, for example, only the objects that are relevant to the operation of the driver assistance system of the motor vehicle may be indicated in the surroundings map. The fact that the objects that are arranged outside the predetermined area are erased means that little storage effort is involved in providing the surroundings map.

In a further embodiment, the global coordinate system is modelled as a torus. In this case, it is provided in particular that the global coordinate system is modelled as a two-dimensional torus. For instance, it may be the case for example that, when there is movement of the surroundings map, objects first leave an indicating area of the surroundings map on one side and reappear in the indicating area on an opposite side. If a corresponding predetermined area is provided in the surroundings map, it is possible to prevent objects that have left this area from being geometrically depicted falsely at a later time. If the global coordinate system is modelled as a torus, the surroundings map can be provided in a way that involves little storage effort.

It is also advantageous if, in addition to the position value, at least one characteristic of the object is stored in the surroundings map. The characteristic of the object may characterize the object itself. It may also be provided that the characteristic characterizes the measurement of the object. Consequently, apart from the position of the object, the characteristics of the object may also be stored in the surroundings map. In this case, it may also be provided that the at least one characteristic that is stored in addition to the position value in the surroundings map can be altered at any time. This means that the at least one characteristic can be changed or erased. It is also conceivable that a characteristic is added to the position value at any time. These characteristics may for example be used for controlling the driver assistance system of the motor vehicle or else be used for a data fusion.

The determined vector and/or a time at which the position of the object was determined and/or an identification of the object is preferably stored in the surroundings map as the at least one characteristic. On the basis of the determined vector, the position of the object or the relative position of the object in relation to the motor vehicle can be determined in the vehicle coordinate system. This information can also be stored in the surroundings map. In addition, the time at which the object was detected and/or the position of the object was determined may be stored in the surroundings map. This may be necessary for example because the occurrence of data is asynchronous and most of the information with respect to the detected object is in the past. In particular if the motor vehicle has been moved further, the information with respect to the time of the measurement may be useful. For instance, the relative position of the motor vehicle in relation to the object may for example be determined in dependence on the time. It may also be investigated whether the object is static. As an alternative to this, it may for example be determined whether the object is no longer in the surrounding vicinity of the motor vehicle. It may also be provided that an identification or an ID of the object is stored in the surroundings map. This may for example be advantageous if a number of objects are detected in the surrounding vicinity of the motor vehicle and are entered in the surroundings map.

It is also advantageous if dimensions of an indicating element for indicating the position value in the surroundings map are adapted in dependence on a covariance value describing an accuracy of the detection of a position of the object. In the simplest case, the object may be represented in the surroundings map as a point. The sensors of the sensor device with which the object is detected usually have a spatial uncertainty or a spatial inaccuracy. This spatial uncertainty may be expressed in a covariance value. On the basis of the covariance value, a dimension of an indicating element for indicating the object in the surroundings map may be adapted. If, for example, the object can only be detected inaccurately, the indicating element may be represented as larger in the surroundings map. If the object or the position of the object can be determined accurately, the indicating element may be represented as smaller.

In one embodiment, the position of the object is determined by at least two distance sensors of the sensor device and the dimensions of the indicating element are adapted in dependence on the position determined by the at least two distance sensors. The sensor device may for example comprise at least one ultrasonic sensor, at least one laser scanner, at least one lidar sensor, at least one radar sensor and/or at least one camera. In this case, the object in the surrounding area of the motor vehicle can be detected by at least two distance sensors. These distance sensors usually have different spatial uncertainties. In this case, the sensor data of the at least two distance sensors can be fused. This allows the accuracy in the detection of the object to be increased. The increase in the accuracy in the detection of the object may for example lead to the indicating element being represented as smaller in the surroundings map.

The driver assistance system according to the invention comprises a control device, which is designed to carry out a method according to the invention. The driver assistance system may serve for example for parking space measurement. Furthermore, the driver assistance system may assist the driver when parking and/or leaving a parking space. The driver assistance system may also serve for protecting the motor vehicle from a collision with an object. Furthermore, the driver assistance system may also be used for navigating the motor vehicle fully automatically.

The control device of the driver assistance system is preferably designed to manoeuvre the motor vehicle at least semi-autonomously on the basis of the surroundings map. The control device may for example determine a driving trajectory along which the motor vehicle is intended to be manoeuvred in order to prevent a collision with the object. In this case, the driver assistance system or the control device may take over the steering of the motor vehicle. In this case, the driver takes over the actuation of the accelerator pedal and the brake. As an alternative to this, it may also be provided that the driver assistance system or the control device intervenes in a driving device and a braking device of the motor vehicle and autonomously manoeuvres the motor vehicle.

A motor vehicle according to the invention comprises a motor vehicle according to the invention. The motor vehicle is formed in particular as a passenger car.

The surroundings map may also be designed to be transferred from the motor vehicle to a further vehicle, a further road user and/or an infrastructure. For this purpose, the surroundings map may for example be formed in such a way that it conforms to a communications protocol. The surroundings map may for example be formed according to the protocol ADASIS (Advanced Driver Assistance Systems Interface Specifications).

The embodiments presented with respect to the method according to the invention and their advantages apply correspondingly to the driver assistance system according to the invention and to the motor vehicle according to the invention.

Further features of the invention are provided by the claims, the figures and the description of the figures. All of the features and combinations of features that are mentioned above in the description and also the features and combinations of features that are mentioned below in the description of the figures and/or are shown in the figures alone can be used not only in the combination respectively specified but also in other combinations or else on their own.

The invention is now explained in more detail on the basis of a preferred exemplary embodiment, and with reference to the accompanying drawings, in which.

Figure 1:
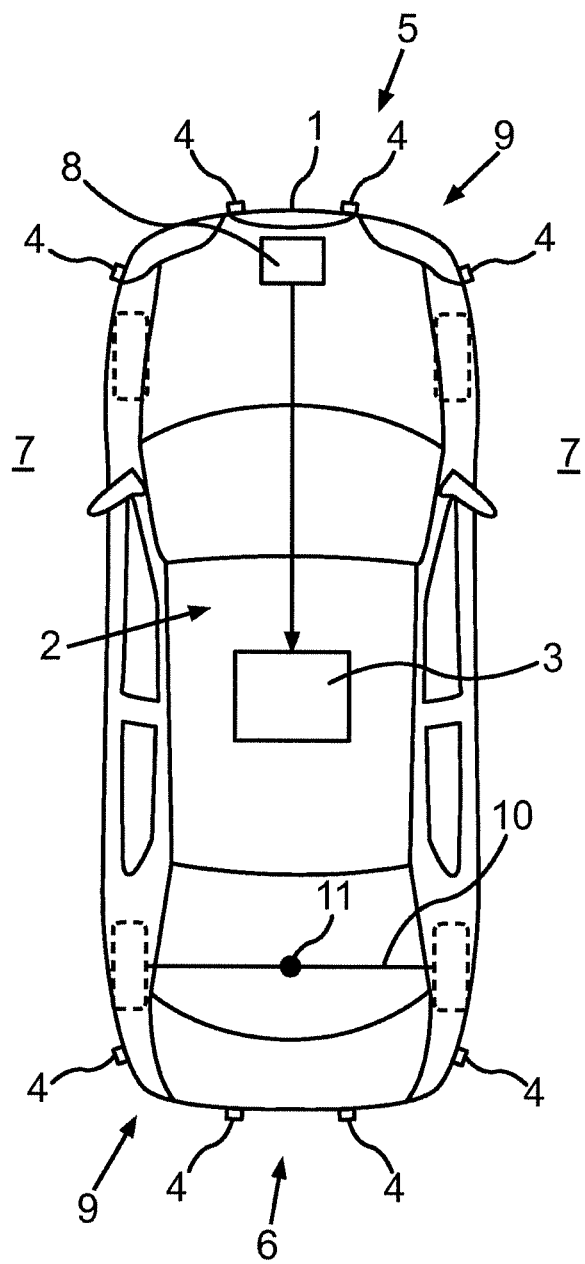
FIG. 1 shows a motor vehicle according to one embodiment of the present invention in a schematic representation.

FIG. 1 shows a motor vehicle 1 according to one embodiment of the present invention. The motor vehicle 1 comprises a driver assistance system 2. The driver assistance system 2 comprises in turn a control device 3, which may for example be formed by a control unit (Electronic Control Unit, ECU) of the motor vehicle 1. Furthermore, the driver assistance system 2 comprises a sensor device 9.

In the present exemplary embodiment, the sensor device 9 comprises eight ultrasonic sensors 4. In this case, four ultrasonic sensors are arranged in a front region 5 of the motor vehicle 1 and four ultrasonic sensors are arranged in a rear region 6 of the motor vehicle 1. With the aid of the ultrasonic sensors 4, at least one object in a surrounding area 7 of the motor vehicle 1 can be detected. Moreover, the distance between the motor vehicle 1 or one of the ultrasonic sensors 4 and the object can be determined. For this purpose, the ultrasonic sensor 4 emits an ultrasonic signal. This ultrasonic signal is reflected by the object and received again by the ultrasonic sensor 4. On the basis of the transit time of the ultrasonic signal, the distance between the motor vehicle 1 or the ultrasonic sensor 4 and the object can be determined. The control device 3 is connected to the ultrasonic sensors 4 for data transmission. Corresponding data lines are not represented in the present case for the sake of overall clarity.

Furthermore, the sensor device 9 comprises a radar sensor 8. The radar sensor 8 also serves for detecting an object in the surrounding area 7 of the motor vehicle 1 and determining the distance from the object. For this purpose, the radar sensor 8 emits a radar signal or an electromagnetic wave. The electromagnetic wave reflected by the object can be received again by the radar sensor 8. Here, too, a distance between the motor vehicle 1 or the radar sensor 8 and the object can be determined on the basis of the transit time of the electromagnetic wave. The radar sensor 8 is connected to the control device 3 for data communication.

The driver assistance system 2 may also be designed for determining a current position of the motor vehicle 1. For this purpose, the signals of a satellite-assisted position determination system may be taken into consideration. It may also be provided that the current position of the motor vehicle 1 is determined by means of odometry. For this purpose, for example, the number of revolutions of at least one wheel of the motor vehicle 1 and/or a steering angle of the motor vehicle 1 may be detected. In this way, the movement of the motor vehicle 1 itself can also be determined.

The control device 3 may also be formed for calculating a driving trajectory of the motor vehicle 1 that describes a collision-free movement of the motor vehicle 1 past an object. For this purpose, the outer dimensions of the motor vehicle 1, which are for example stored in a memory unit of the control device 3, may also be taken into consideration. By means of the driver assistance system 2, the motor vehicle 1 can then be moved semi-autonomously along the driving trajectory. This may for example involve the steering being taken over by the driver assistance system 2. The driver continues to actuate the accelerator pedal and the brake. As an alternative to this, the motor vehicle 1 may also be moved autonomously along the driving trajectory. This involves the driver assistance system 2 also controlling the drive and the brake of the motor vehicle 1.

If an object in the surrounding area 7 of the motor vehicle 1 is detected by the sensor device 9 or the ultrasonic sensors 4 and/or the radar sensor 8, this is intended to be entered in a surroundings map 14. The surroundings map 14 describes at least one area of the surrounding area 7 of the vehicle 1. For this purpose, first a reference point 11 of the motor vehicle 1 is predetermined. In the present case, the reference point 11 is located at the midpoint of the rear axle 10 of the motor vehicle 1. The positions of the respective ultrasonic sensors 4 in the motor vehicle 1 are stored in the control device 3. Moreover, the position of the radar sensor 8 within the motor vehicle 1 is stored in the control device 3. If an object in the surrounding area 7 of the motor vehicle is detected by an ultrasonic sensor 4 or a number of ultrasonic sensors 4 and/or by the radar sensor 8, in each case the relative position between the respective sensor 4, 8 and the object is determined. On the basis of the arrangement of the sensors 4, 8 in the motor vehicle 1, the control device 3 can calculate the relative position of the object in relation to the reference point 11.

Figure 2:
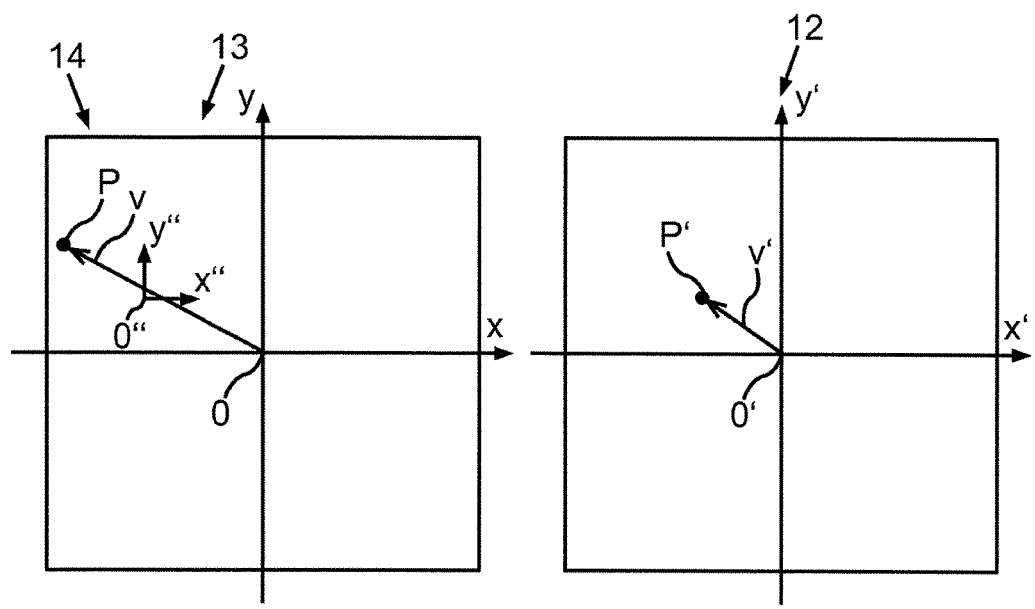
FIG. 2 shows a global coordinate system of a surroundings map and a vehicle coordinate system.

FIG. 2 shows a vehicle coordinate system 12 and a global coordinate system 13 of a surroundings map 14. The vehicle coordinate system 12 has an origin 0', which is arranged at the reference point 11, that is to say the midpoint of the rear axle 10, of the motor vehicle 1. The vehicle coordinate system 12 has the two axes x' and y'. In this case, the axis x' may extend along the longitudinal axis of the vehicle and the axis y' may extend along the transverse axis of the vehicle. In the present case, the position P' of the object is entered in the vehicle coordinate system 12. In the present case, the object is located in the rear left region of the motor vehicle 1. Furthermore, a vector v' between the origin 0' of the vehicle coordinate system 12 and the position P' of the object in the vehicle coordinate system 12 is determined.

The determined vector v' is intended to be transformed from the vehicle coordinate system 12 into a global coordinate system 13 of the surroundings map 14. The surroundings map 14 describes at least one area of the surrounding area 7 of the motor vehicle 1. In this case, a global coordinate system 13 or a world coordinate system is used for describing the surrounding area 7 in the surroundings map 14. This global coordinate system 13 may for example be modelled as a torus, in particular as a two-dimensional torus. A torus may be used because only a similar memory is available. The global coordinate system 13 has a first axis x and a second axis y. In addition, the global coordinate system 13 has an origin 0, which is established for example when the driver assistance system is started. The vector v' in the vehicle coordinate system 12 is transformed into the global coordinate system 13. This may be performed according to a predetermined coordinate transformation. This allows the transformed vector v to be represented in the global coordinate system 13. On the basis of the transformed vector v, a position value P, which describes the position of the object, can be determined and indicated in the global coordinate system 13.

In the present case, the transformed origin 0" of the vehicle coordinate system 12 and also the two axes x" and y" of the vehicle coordinate system 12 transformed into the global coordinate system 13 are indicated in the global coordinate system 13. This allows the relative position of the motor vehicle 1 or of the reference point 11 of the motor vehicle 1 in relation to the object to be determined on the basis of the surroundings map 14.

Figure 3:
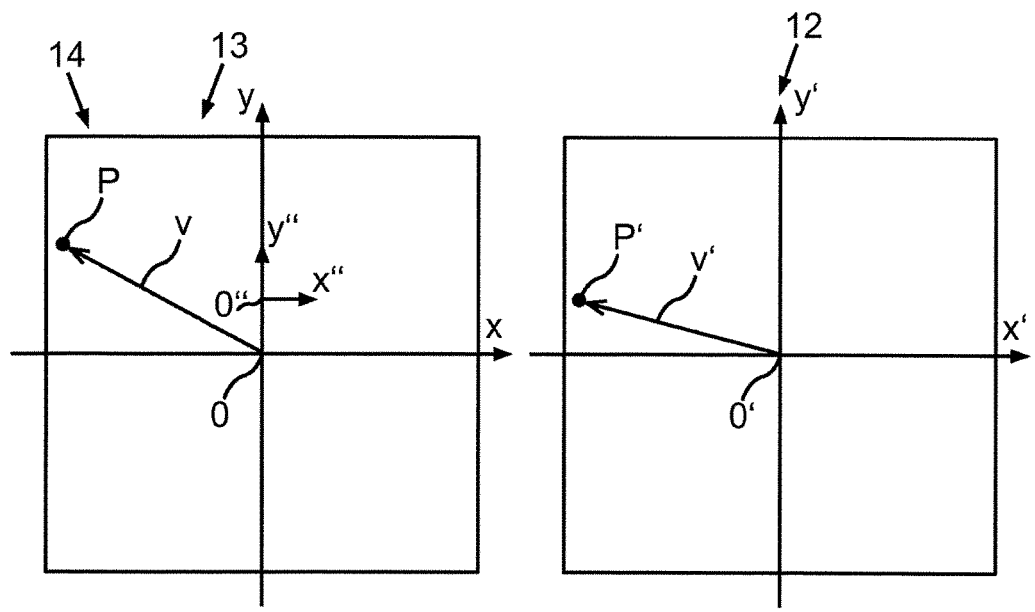
FIG. 3 shows the global coordinate system and the vehicle coordinate system in a further embodiment.

FIG. 3 shows the vehicle coordinate system 12 and the global coordinate system 13 according to FIG. 2 at a later time. Here, the motor vehicle 1 has been moved further along the axis x' of the vehicle coordinate system 12. In this case, the position P' of the object with respect to the origin 0' in the vehicle coordinate system 12 alters. In the global coordinate system 13, the originally determined position P of the object is fixed or independent of the movement of the motor vehicle 1. In the global coordinate system, the origin 0" of the vehicle coordinate system 12 transformed into the global coordinate system 13 is updated. This allows current information with respect to the relative position of the motor vehicle 1 in relation to the object to be determined from the surroundings map 14.

Figure 4:
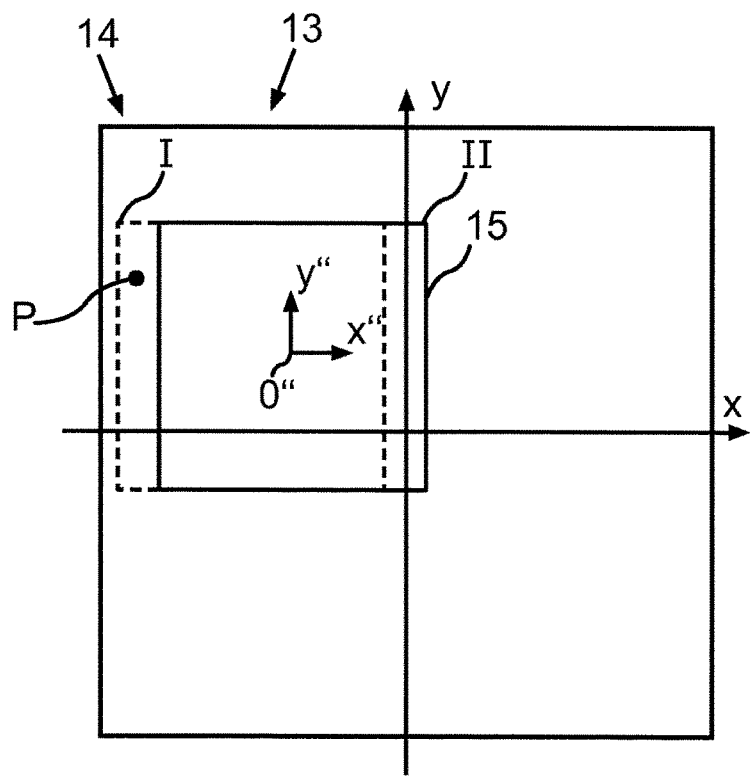
FIG. 4 shows the global coordinate system in which a predetermined area is provided.

FIG. 4 shows the surroundings map 14 in a further embodiment. Here, a predetermined area 15 is provided within the surroundings map 14 or within the global coordinate system 13. In this case, only objects that are arranged within this predetermined area 15 are indicated in the surroundings map 14. Objects or points that are arranged outside this predetermined area are erased in the surroundings map 14. In the present case it is shown how the predetermined area 15 moves as a consequence of the movement of the motor vehicle 1 from the position I into the position II. If the predetermined area is in the position II, the position value P is no longer arranged in the predetermined area 15 and is erased. This is advantageous in particular because the global coordinate system 13 is modelled as a torus. It can consequently be prevented that, once they leave the predetermined area 15, objects or points are not geometrically depicted falsely at a later time.

Figure 5:
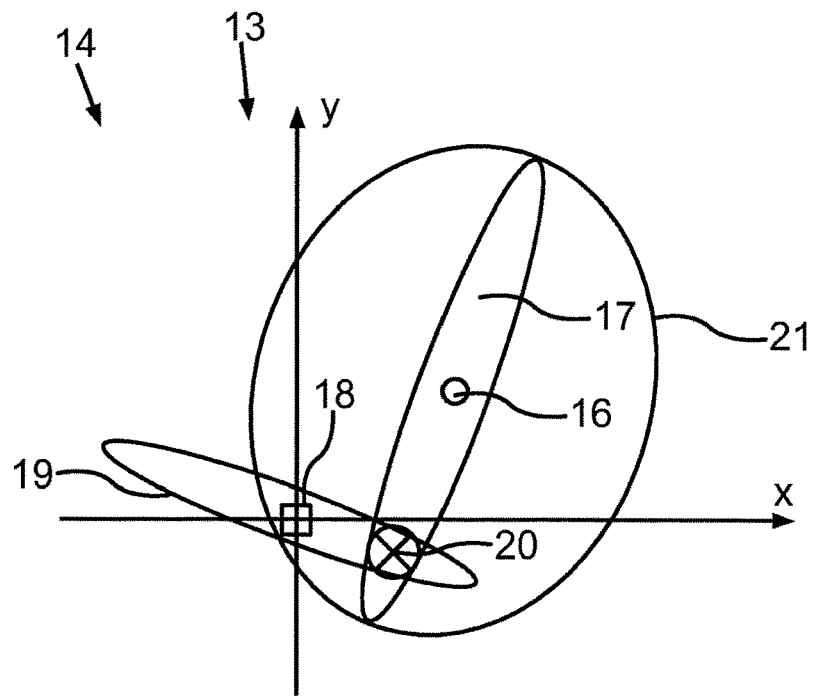
FIG. 5 shows measuring points of various distance sensors that are represented in the surroundings map.

FIG. 5 shows the surroundings map 14 and the global coordinate system 13 in a further embodiment. In this case, a first measuring point 16 describes the position of the object in the surrounding area 7, which has for example been determined by one of the ultrasonic sensors 4. The area 17 describes the covariance or spatial uncertainty that there is when measuring the measuring point 17. Also shown in the global coordinate system is a measuring point 18, the area of which likewise represents the spatial uncertainty 19. The measuring point 18 may for example have been recorded by the radar sensor 8. If the two measuring points 16 and 18 are fused with one another by means of data fusion, the point 20 may for example be formed. This can be assigned an indicating element 21 which serves for indicating the position value P. The dimensions of the indicating element 21 are determined on the basis of the covariances or the spatial uncertainties 17 and 18.

In the present case, the fusion of the sensor data is therefore performed by way of the spatial uncertainty of the objects detected. For the result, a new geometrical position may be determined. This can be performed very easily because the position information is based on vectors. This can be performed very easily because the surroundings map 14 is based on vectors. However, it is also possible likewise for more simple or more complex models to be implemented, to be specific in such a way that the present method is replaced or supplemented. In this way, the vectorial surroundings map 14 does not influence the accuracy of the detection of the objects. The surroundings map 14 is only dependent on the sensor 4, 8 itself and the chosen sensor models for the fusion.

The surroundings map 14 described in the present case has the advantage over a grid-based surroundings map that the surroundings map 14 can be dynamically scaled without data being made excessively abstract or even data being lost. This means that data can be stored very efficiently. For example, different surroundings maps 14 for a near area and a far area may be provided. In the near area, the surroundings map 14 may have a resolution of several centimeters. In the far area, the surroundings map 14 may for example have a resolution of several kilometers. Since the objects are stored vectorially in the surroundings map 14, they can be transferred very easily into the various maps or indicating areas. A further advantage of the surroundings map 14 is that it is not necessary to use standardized scaling if different sensors with differing scaling are used.

Furthermore, the surroundings map 14 or the vectorial map is independent of a predefined grid size. If, for example, two objects of two different sensors fall in a grid or in an area, they are usually assumed to be associated with the same object. Consequently, the chosen grid has a great influence on the fusion result and on the accuracy of the objects.

The invention claimed is:

1. A method for generating a surroundings map of a surrounding area of a motor vehicle comprising:
   detecting an object in the surrounding area using a sensor device of the motor vehicle;
   determining a position value that describes a position of the object on the basis of sensor data of the sensor device, using by means of a control device of the motor vehicle;
   transferring the determined position value into the surroundings map; and
   determining a vector between the object and a predetermined reference point of the motor vehicle that forms an origin of a vehicle coordinate system, the determined vector being transformed from the vehicle coordinate system into a global coordinate system of the surroundings map,
   wherein the position value in the surroundings map is determined on the basis of the transformed vector,
   wherein the origin of the vehicle coordinate system is transformed into the global coordinate system and the transformed origin of the vehicle coordinate system is indicated in the surroundings map, and
   wherein on the basis of the transformed origin of the vehicle coordinate system, an area for indicating the position value in the global coordinate system is predetermined.

2. The method according to claim 1, wherein the position value is determined additionally on the basis of a predetermined origin of the global coordinate system.

3. The method according to claim 1, wherein a movement of the motor vehicle itself is continuously determined and the position of the origin of the vehicle coordinate system in the surroundings map is changed on the basis of the determined movement of the motor vehicle itself.

4. The method according to claim 1, wherein the position value is erased from the surroundings map if the position value of the object is outside the predetermined area.

5. The method according to claim 1, wherein the global coordinate system is modelled as a torus.

6. The method according to claim 1, wherein in addition to the position value, at least one characteristic of the object is stored in the surroundings map.

7. The method according to claim 6, wherein the determined vector and/or a time at which the position of the object is determined and/or an identification of the object is stored in the surroundings map as the at least one characteristic.

8. The method according to claim 1, wherein dimensions of an indicating element for indicating the position value in the surroundings map are adapted in dependence on a covariance value describing an accuracy of the detection of the position of the object.

9. The method according to claim 8, wherein the position of the object is determined by at least two distance sensors of the sensor device and the dimensions of the indicating element are adapted in dependence on the position determined by the at least two distance sensors.

10. A driver assistance system for a motor vehicle with a control device, configured to:
    detect an object in the surrounding area using a sensor device of the motor vehicle;
    determine a position value that describes a position of the object on the basis of sensor data of the sensor device, using by means of the control device of the motor vehicle;
    transfer the determined position value into a surroundings map; and
    determine a vector between the object and a predetermined reference point of the motor vehicle that forms an origin of a vehicle coordinate system, the determined vector being transformed from the vehicle coordinate system into a global coordinate system of the surroundings map,
    wherein the position value in the surroundings map is determined on the basis of the transformed vector,
    wherein the origin of the vehicle coordinate system is transformed into the global coordinate system and the transformed origin of the vehicle coordinate system is indicated in the surroundings map, and
    wherein on the basis of the transformed origin of the vehicle coordinate system, an area for indicating the position value in the global coordinate system is predetermined.

11. The driver assistance system according to claim 10, wherein the control device is configured to manoeuvre the motor vehicle at least semi-autonomously on the basis of the surroundings map.

12. A motor vehicle comprising a driver assistance system configured to:
    detect an object in the surrounding area using a sensor device of the motor vehicle;
    determine a position value that describes a position of the object on the basis of sensor data of the sensor device, using by means of a control device of the motor vehicle;
    transfer the determined position value into a surroundings map; and
    determine a vector between the object and a predetermined reference point of the motor vehicle that forms an origin of a vehicle coordinate system, the determined vector being transformed from the vehicle coordinate system into a global coordinate system of the surroundings map,
    wherein the position value in the surroundings map is determined on the basis of the transformed vector,
    wherein the origin of the vehicle coordinate system is transformed into the global coordinate system and the transformed origin of the vehicle coordinate system is indicated in the surroundings map, and
    wherein on the basis of the transformed origin of the vehicle coordinate system, an area for indicating the position value in the global coordinate system is predetermined.

* * * * *